US012604057B2

(12) United States Patent
Sanders et al.

(10) Patent No.: US 12,604,057 B2
(45) Date of Patent: Apr. 14, 2026

(54) STREAMING SYSTEM AND METHOD

(71) Applicant: Sony Interactive Entertainment Inc., Tokyo (JP)

(72) Inventors: Matthew William Sanders, London (GB); Justin Lim, London (GB); Sahin Serdar Kocdemir, London (GB); Marina Villanueva Barreiro, Acoruña (ES)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/964,989

(22) Filed: Oct. 13, 2022

(65) Prior Publication Data

US 2023/0127471 A1 Apr. 27, 2023

(30) Foreign Application Priority Data

Oct. 25, 2021 (GB) ...................................... 2115301

(51) Int. Cl.
| | |
|---|---|
| *H04N 21/442* | (2011.01) |
| *H04N 19/42* | (2014.01) |
| *H04N 21/4402* | (2011.01) |
| *H04N 21/658* | (2011.01) |

(52) U.S. Cl.
CPC ....... *H04N 21/44218* (2013.01); *H04N 19/42* (2014.11); *H04N 21/4402* (2013.01); *H04N 21/658* (2013.01)

(58) Field of Classification Search
CPC ......... H04N 21/44218; H04N 21/4402; H04N 21/658; H04N 19/42
See application file for complete search history.

(56) References Cited

U.S. PATENT DOCUMENTS

| | | | |
|---|---|---|---|
| 10,200,753 B1 | 2/2019 | Hao | |
| 2003/0052911 A1* | 3/2003 | Cohen-Solal | ........... H04L 47/24 |
| | | | 715/738 |
| 2010/0295839 A1 | 11/2010 | Nagaya | |
| 2011/0064391 A1* | 3/2011 | Hisamoto | ................ H04N 5/93 |
| | | | 386/354 |
| 2018/0288120 A1* | 10/2018 | Dorwin | ................. H04L 65/613 |

(Continued)

FOREIGN PATENT DOCUMENTS

| | | | | |
|---|---|---|---|---|
| EP | 0739139 A2 | * | 10/1996 | |
| EP | 1843592 A1 | * | 10/2007 | ........... G11B 27/105 |

(Continued)

OTHER PUBLICATIONS

Extended European Search Report for corresponding EP Application No. 22198190.5, 7 pages, dated Nov. 23, 2022.

(Continued)

*Primary Examiner* — Chenea Davis

(74) *Attorney, Agent, or Firm* — Kilpatrick Townsend & Stockton LLP

(57) ABSTRACT

A method of displaying streamed content includes receiving streamed content from a server, decoding the streamed content, outputting the decoded streamed content for display, and estimating a degree of attention of a user on the streamed content, where the decoding step comprises decoding the content to a quality that is dependent upon the estimated degree of attention of the use.

11 Claims, 5 Drawing Sheets 200     10

(56) References Cited

U.S. PATENT DOCUMENTS

2020/0196024 A1 * 6/2020 Hwang .............. H04N 21/2353
2021/0211739 A1 * 7/2021 Andreopoulos ..... H04N 19/103

FOREIGN PATENT DOCUMENTS

EP          4171042 A1    4/2023
WO      WO-2020128625 A1 *  6/2020

OTHER PUBLICATIONS

Combined Search and Examination Report for corresponding GB
Application No. 2115301.0, 14 pages, dated Jun. 29, 2022.
Examination Report for corresponding GB Application No. 2115301.
0, 3 pages, dated Jul. 12, 2024.

* cited by examiner

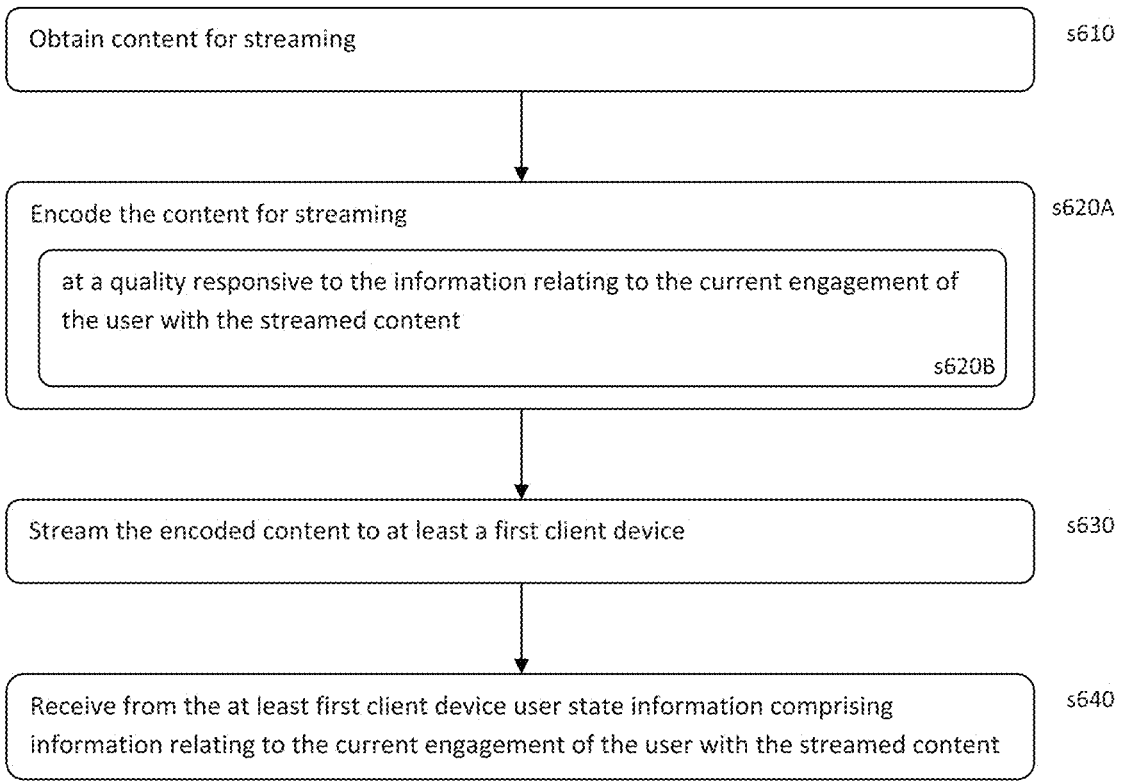

Obtain content for streaming                                                                    s610

Encode the content for streaming                                                               s620A at a quality responsive to the information relating to the current engagement of
the user with the streamed content s620B Stream the encoded content to at least a first client device                                   s630

Receive from the at least first client device user state information comprising               s640
information relating to the current engagement of the user with the streamed content

Figure 6

STREAMING SYSTEM AND METHOD

BACKGROUND OF THE INVENTION

Field of the invention

The present invention relates to a streaming system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Streaming systems for interactive entertainment (such as PlayStation Now®) typically use conventional image encoding schemes for transmitting rendered graphics from a server based videogame console, on which a game is being run, to a client device on which the game is effectively being played.

This can place additional load on the server based videogame console, but also on the client device decoding the stream. For a battery powered client device, and/or one that is also using computing resources for other purposes at the same time, this load can be an unwanted overhead. It can also impose a minimum performance requirement on the client devices that can be used that is higher than desired, and excludes the devices of some users from the service.

The present invention seeks to address or mitigate such problems.

SUMMARY OF THE INVENTION

Various aspects and features of the present invention are defined in the appended claims and within the text of the accompanying description.

In a first aspect, a client device for displaying streamed content is provided, comprising: a receiver to receive streamed content from a server; a decoder configured to decode the streamed content; an output for outputting the decoded streamed content for display; and an attention estimation processor configured to estimate a degree of attention of a user on the streamed content; wherein the decoder decodes the content to a quality that is dependent upon the estimated degree of attention of the user.

In another aspect, a server for streaming content is provided, comprising: a content processor configured to obtain content for streaming; an encoder configured to encode the content for streaming; a network output for streaming the encoded content to at least a first client device; and a receiver configured to receive from the at least first client device user state information comprising information relating to the current engagement of the user with the streamed content; and in which the encoder encodes the content for streaming at a quality responsive to the information relating to the current engagement of the user with the streamed content.

In another aspect, a method of displaying streamed content is provided, comprising receiving streamed content from a server; decoding the streamed content; outputting the decoded streamed content for display; and estimating a degree of attention of a user on the streamed content;

wherein the decoding step comprises decoding the content to a quality that is dependent upon the estimated degree of attention of the user.

In another aspect, a method of streaming content to a client is provided, comprising obtaining content for streaming; encoding the content for streaming; streaming the encoded content to at least a first client device; and receiving from the at least first client device user state information comprising information relating to the current engagement of the user with the streamed content; and in which the encoding step comprises encoding the content for streaming at a quality responsive to the information relating to the current engagement of the user with the streamed content.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is a flow diagram of method of streaming content to a client in accordance with embodiments of the present description.

DESCRIPTION OF THE EMBODIMENTS

A streaming system and method are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
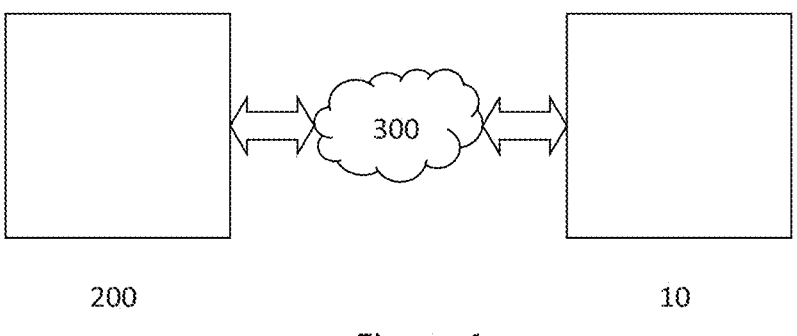
FIG. 1 is a schematic diagram of a streaming system in accordance with embodiments of the present description.

Referring now to the drawings, wherein like reference numerals designate identical or corresponding parts throughout the several views, FIG. 1 shows a server 200 connected to a client device 10 such as a mobile phone, tablet, videogame console, PC, smart TV or more generally any suitable entertainment device. The connection is typically via a network 300 such as the Internet, or a LAN or WAN.

Figure 2:
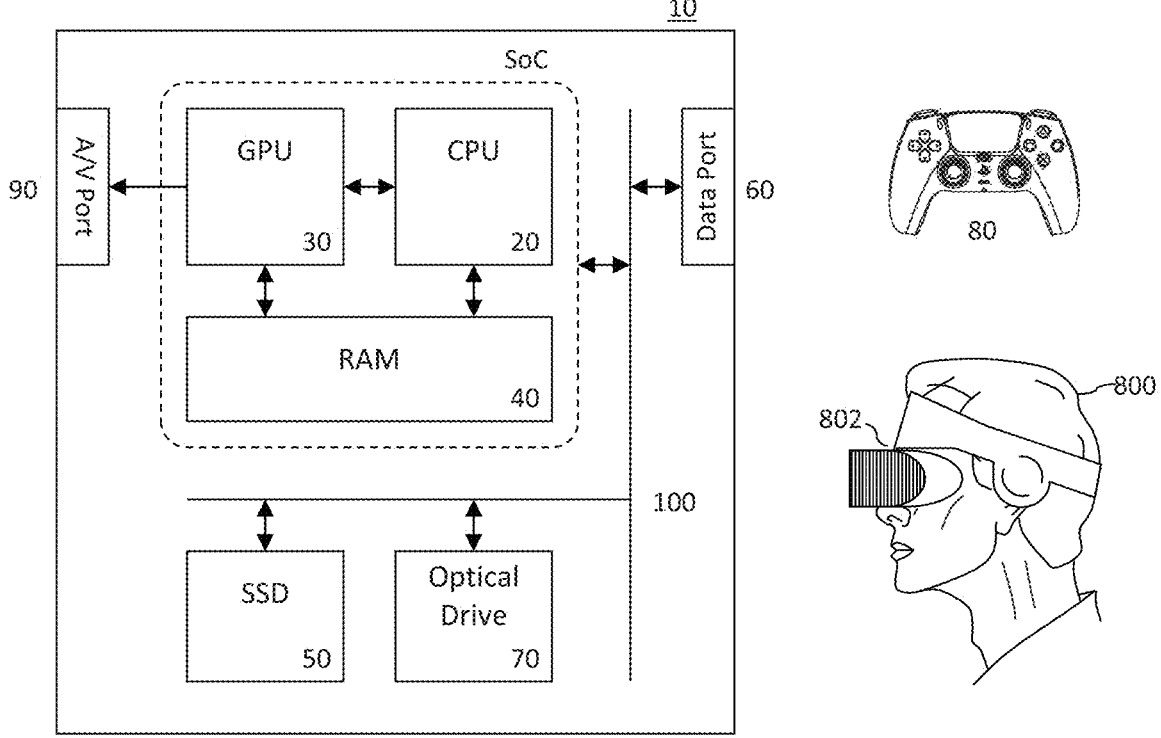
FIG. 2 is a schematic diagram of an entertainment device in accordance with embodiments of the present description.

As a nonlimiting example provided for the purposes of explanation, referring to FIG. 2 a Sony PlayStation 5® ('PS5') may act as the client device 10 and as an example of a suitable entertainment system.

The PlayStation client device 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, WiFi® port, Bluetooth® port or similar, as appropriate. It may also optionally receive data via an optical drive 70.

Interaction with the system is typically provided using one or more handheld controllers 80, such as the DualSense® controller in the case of the PS5.

Audio/visual outputs from the entertainment device are typically provided through one or more A/V ports 90, or through one or more of the wired or wireless data ports 60.

Where components are not integrated, they may be connected as appropriate either by a dedicated data link or via a bus 100.

An example of a device for displaying images output by the entertainment system is a head mounted display 'HMD' 802, worn by a user 800.

Where the source game may be run by a PlayStation 5, then it will be appreciated that the PlayStation 5 of a similar entertainment system may also act as an exemplary server 200, either configured by software to act in a server role, or as an active component of a server managing a streaming process (for example comprising one or more PlayStation 5 systems (for example either as consumer units, rack mounted units, or virtualised) and coordinating the encoding and streaming of their respective output to one or more clients).

In operation, the server runs the game (or more generally obtains—e.g. generates or retrieves—the content to be served to the client), and encodes the output for streaming to the client (or clients, for example in the case of some multiplayer games). The output stream may be routed to the relevant client(s) by any suitable streaming, IP broadcast, or multicast protocol as applicable.

The server also receives state information from the (or each) client. Conventionally this comprises input information such as button presses on the controller 80, and optionally other input information such as positional data from motion sensors within the controller. It will be appreciated that some client devices comprise integral controller inputs (such as handheld videogame consoles), or define these in software (such as on-screen control overlays used by mobile phones, tablets and the like).

Meanwhile the client, in addition to transmitting state information to the server, also receives the streamed output and decodes it for display to the user. It will be appreciated that it in particular for interactive content, it is beneficial to reduce or minimise the time lag between the generation of the content at the server and the eventual display of that content at the client, as this time lag contributes to an overall disparity between game state and effective user input that can adversely affect gameplay or more generally interaction with the generated or retrieved content.

This issue may be particularly acute where the encoding/decoding scheme is computationally complex, for example in order to provide a good quality image at low bandwidth.

As a non-limiting example, one such scheme is a neural network (NN) based compression/decompression scheme such as an autoencoder. Typically such a scheme comprises training a neural network to output the same image as the input, with a hidden layer of the neural network comprising a smaller number of nodes than the input and output layers and generating values that act as the encoded data. The ratio of nodes between the input/output layers and this constrained layer is thus indicative of the compression ratio.

At the encoding (server) side, the trained neural network can then take the input image and process it at least as far as this constrained hidden layer; the values from that layer are then transmitted as the compressed signal (optionally with any further suitable compression scheme applied) and (after any corresponding optional decompression) inserted into the corresponding layer of a copy of the trained neural network at the decoding (client) side, where the second part of the neural network is run to output the original image.

The image input to the network (and output from it) may be broken into tiles (for example 256×256, or 128×128) for respective processing, so that the neural network itself is not so large that for example it causes memory issues on a low capability client device. The image input may itself be processed rather than being a set of image pixel values—for example being represented by spatial frequency values, movement vectors and the like such as may be found in JPEG, MPEG, or other image or video encoding schemes. In this case the original image is suitably pre-processed at the server and the output post-processed at the client.

It will be appreciated that whilst such a scheme may provide a good quality image with a high compression ratio, running even the 'decoder' half of the neural network—possibly in addition to a further decoder such as an MPGE decoder or other spatial frequency and/or motion vector based decoder—can pose a significant computational overhead on the client.

For an application such as game streaming, where a significant benefit is the ability to play games on a device that does not have the computational capability to play the game natively, the ability to stream (and hence decode the stream) on lower-specification devices is clearly preferable.

Accordingly it is desirable to reduce the computational overhead of the neural network decoder in the client.

One scheme for more efficient streaming may be to differentiate decoding according to the current usage scenario, to reduce computational overhead and, for example, increase battery life of the device. This in turn requires a variable decoder and a form of encoding that allows the use of such a variable decoder.

Optionally it may also be beneficial to differentiate the encoding according to the current usage scenario. This in turn can reduce bandwidth and further reduce computational overhead at the client device.

Figure 3:
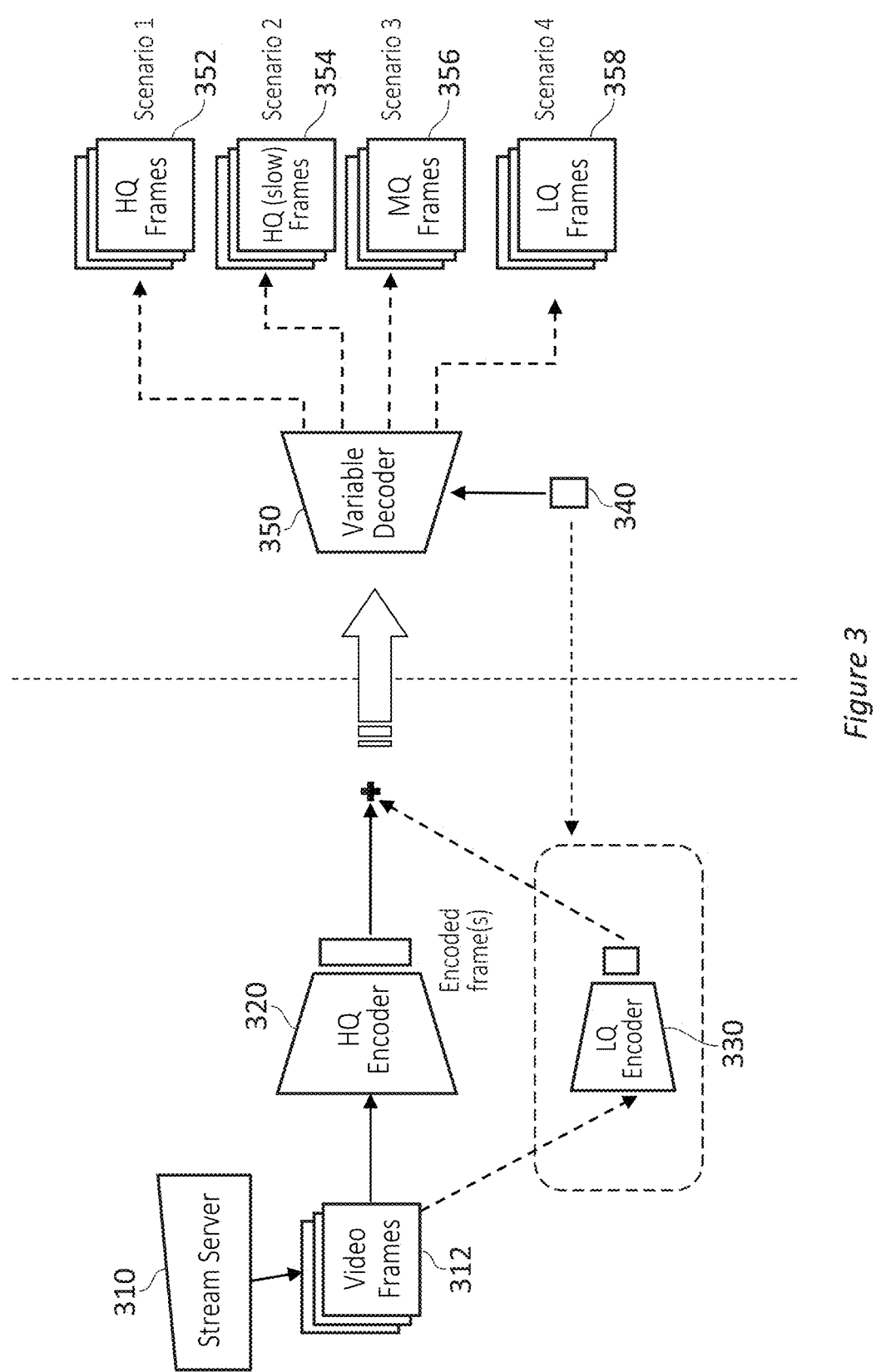
FIG. 3 is a schematic diagram of an encoder and decoder in accordance with embodiments of the present description.

Turning now to FIG. 3, this illustrates a generalised encoder/decoder scheme independent of any specific implementation these schemes (such as a neural network autoencoder).

A streaming server 310 provides source of video frames 312. As noted previously these video frames may come from conventional or interactive content such as a video game generated either by the streaming server itself or from a separate gaming server that outputs images to the streaming server.

The video frames 312 are output to an encoder. In a first instance there is one high quality encoder 320 that creates an encoded version of the video frames, but as explained later herein optionally there may be a second lower quality encoder 330 that generates a lower quality encoded version of the video frames, either instead of or in addition to the high quality encoder.

The encoded video frames are then transmitted to the client side, denoted by the arrow passing through the dashed barrier in FIG. 3.

The encoded video frames are received by a variable decoder 350, which is capable of decoding the images to generate various types of output 352-358 according to different example scenarios.

In scenario one, a user is actively interacting with the displayed content, for example using inputs on the hand-held controller 80, or tracking elements of the content with their eyes (which may be detected for example using an eye tracker of a head mounted display 802 or similar), or has done so within a predetermined period (e.g. the last 5, 10, 20, or 30 seconds). In response, the variable decoder generates high-quality frames 352 roughly equivalent to the source frames 312, subject to any unavoidable losses caused by the encoding/decoding process.

In scenario two, the user is passively consuming the streamed content. For example the user is still engaged with the displayed content, but the content is non-interactive (for example a cut scene in a video game). In this scenario the decoder may still generate high-quality frames similar to the source frames, particularly in the case where the content is inherently non-interactive such as in a film or television programme, but in the case of a video game, it may generate visually high-quality frames at a lower frame rate. Typically, videogames aim to run at around 60 frames per second or higher, whereas normal video playback is in the order of 24, 25, or 30 frames per second and so output at this lower frame rate for noninteractive content would be acceptable to the user. Meanwhile if the decoder of another part of the client performs frame interpolation (e.g. to increase the frame rate of conventional non-interactive content from for example 30 frames per second to 60 or 120) then this can optionally be turned off or reduced to similar effect.

In scenario three, the user is not currently engaged with a display content, but is in a position to do so easily. Hence for example they may be glancing away from the screen, blinking (which for instance may take $\frac{1}{10}$ of a second and hence between 6-12 frames for typical 60-120 Hz frame rates), or their eyes may not be tracking content that may normally be expected to be of interest, such as their avatar or an opponent, indicating that the user is temporarily not paying full attention to the display. In such cases, the variable decoder may generate medium quality frames. The quality may take the form of reduced resolution images, reduced texture detail images, and/or reduced polygon count images, and these reductions may be applied across the whole display, or to peripheral areas of the display away from the display centre, away from content of interest, or away from a focal fovea region of the image as determined by eye tracking. The medium quality may also comprise a reduction in frame rate, for example 10, 20, 30, 40 or 50%.

In this case, however, as noted above the user could easily revert to paying full attention either by glancing back to the screen, completing their blink, or re-tracking the content, and as a result it is still beneficial to receive the high-quality encoded data in this scenario so that the variable decoder can rapidly switch back to higher-quality output when this happens.

In scenario four, the user is temporarily absent from the display (for example due to leaving the room containing the TV, or removing the headmounted display), or may otherwise indicate temporary disengagement from the game, for example by putting down their hand held controller.

In this case, the variable decoder may output low quality frames. Typically these apply the same quality reduction approaches described for the medium quality frames above, but to a greater extent, having one or more of a lower resolution, lower detail, and/or lower polygon count, and optionally a lower frame rate, than in scenario three. This further reduces the computational load of the decoder while still providing the user with sufficient graphical output to understand the current state of the game and the context of their re-entry to it when they return.

In this case, optionally the absence state of the user may be fed back to the server side, so that the high quality encoder can be replaced by the low quality encoder 330 to reduce bandwidth and computational overhead at the server. Typically the low quality encoder may start with a lower resolution input image or pre-processed version thereof, and/or compress further, and/or with greater loss of fidelity, so that the amount of data to be transmitted from the server is less than for the corresponding high quality encoder 320.

Alternatively, if both high quality encoder and low quality encoder streams are already transmitted, then the variable decoder can switch to decoding the low quality stream to further reduce potential overhead. More specifically, the client may switch to a low quality decoder corresponding to the low quality encoder.

The attention/engagement state of the user may be determined by an attention heuristic 340 typically implemented within the client device 10, which tracks indicators of engagement as described above (for example use of the hand-held controller, looking at the display and/or tracking content within the display, and conversely whether or not they are glancing away, blinking, putting the controller down or moving away from the display). Hence an estimate of the degree of attention or engagement of the user may be based on the presence, absence, degree, duration, or frequency as appropriate of one or more of these factors (or any other suitable factor, such as the use of input gestures if appropriate to the system).

An equivalent to scenario three or scenario four is when the user switches to a menu screen. For example an in-game menu (for example an inventory menu, or an options menu) may be considered equivalent to scenario two, where a high frame rate is less essential, or scenario three, in that the user is temporarily not engaged with high quality graphical content, but can return to it quickly. Meanwhile summoning an operating system menu may be considered similar to scenario four in that the user is again absent from the game, this time in a logical rather than physical sense. In both cases it may be appreciated that if a user navigates further into a menu tree, they may be considered to become less and less engaged with the game and so for example aspects of the stream quality may progressively reduce, in particular the frame rate; typically a minimum resolution will always be required for the menu to be legible, but the responsiveness of the menu display can drop considerably (e.g. down to 30 or 10 frames per second) and still be adequate for interaction.

These logical states are likely to occur within the game server rather than at the client as they relate to states of the game or the underlying operating system, and so at least this aspect of the attention heuristic may optionally be run at the game server. The other aspects of the heuristic described above may also be run at the game server, but this would require uploading of appropriate input data from the client device for the attention heuristic. Hence if the client device is capable of implementing the heuristic, it may be more efficient to do so at the client.

It will be appreciated that the above scenarios and the notional levels of quality chosen in response are exemplary only. The skilled person may determine what criteria of engagement with the streamed content to use and what quality or change of quality to implement for each, for example based on the principles outlined above.

Figure 4:
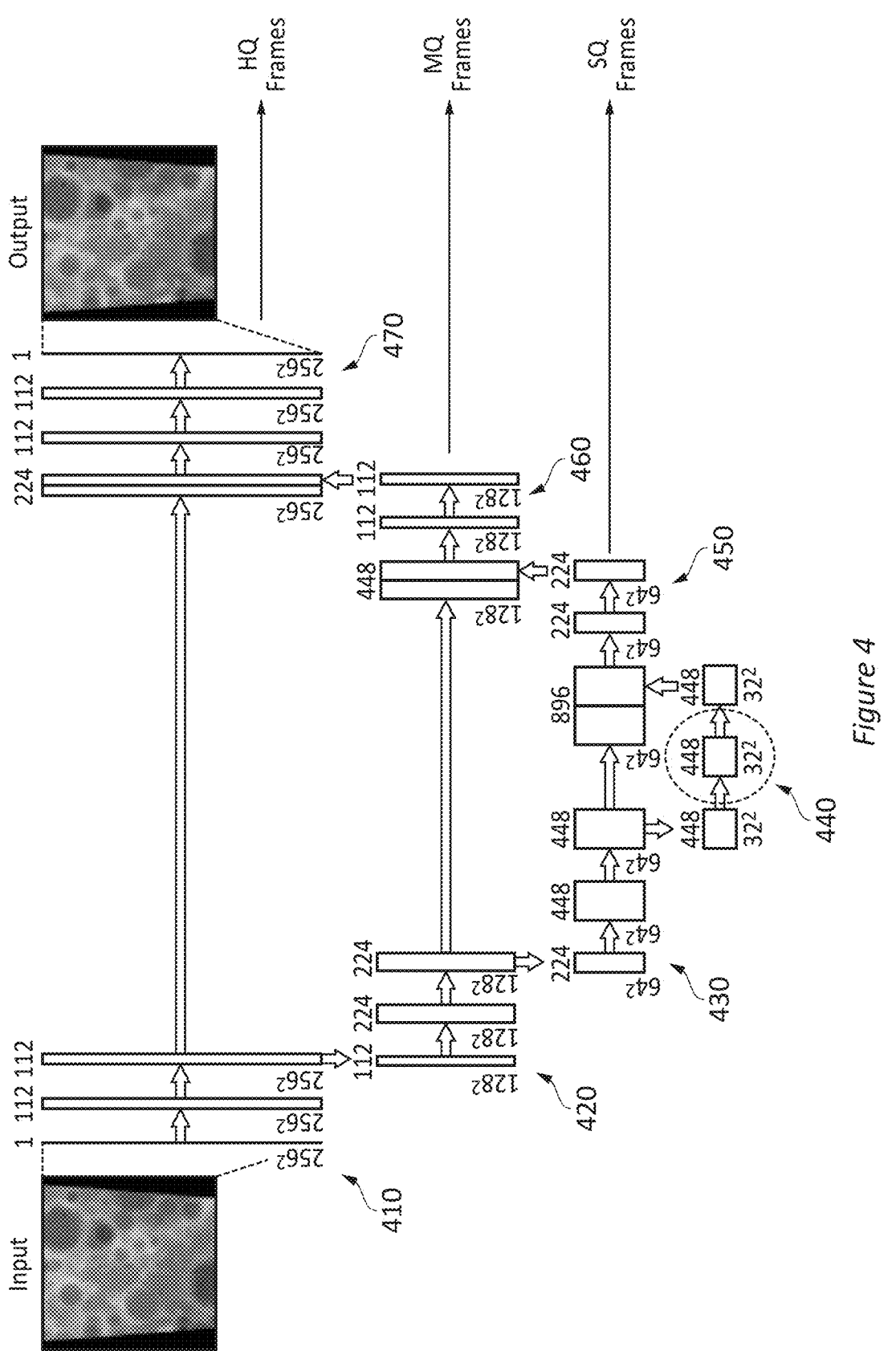
FIG. 4 is a schematic diagram of an encoder and decoder in accordance with embodiments of the present description.

Turning now to FIG. 4, this illustrates a neural network (NN) autoencoder that echoes the general scheme illustrated by FIG. 3.

This NN architecture, known as U-Net, is typically a convolutional neural network architecture that seeks to preserve the size and spatial resolution of the input (in the example, a tile from an image). The architecture is called a U-net because it down-scales (e.g. using so-called max-pool) to smaller network components during the encoding phase, and up-scales (e.g. using up-convolution) to larger network components during the decoder phase which, when illustrated as per FIG. 4, forms a U-shape.

In the figure, down-arrows refer to max-pooling while up-arrows refer to up-convolution, although other alternative network down-scaling and upscaling may be considered as appropriate.

Horizontal arrows between layers of a respective network component (410, 420,. . . etc) link convolution layers, for example with a 3×3 filter and a so-called ReLU non-linear function (other configurations may be considered, such as a 5×5 filter and sigmoid function).

Optionally the final layer of the output network 470 may use a sigmoid function even if the rest of the network is ReLU.

Horizontal arrows between corresponding encoder and decoder network components refer to optionally copying & concatenating data during training.

The numbers at the top of each layer refer to the number of feature maps in a layer, whilst the number vertically positioned along the layer refers to the spatial dimension of the layer, in this case starting with a 256×256, and each subsequent stage reducing this by a factor of 4 (i.e. to 128×128, then 64×64, then 32×32). The figure illustrates a number of feature maps in a layer for a single image channel (e.g. greyscale or one of red, green and blue). Hence for a colour image, typically there will be three times as many feature maps per layer, and for example for encoder network 410, there would be 3, 336, and 336 feature maps in the respective layers.

Thus encoder networks 410, 420, and 430 compress and encode the input data. Transfer network 440 acts as the network that, once the system is trained, is split between encoding and decoding sides as described previously, with the values from the middle layer (indicated by a circle) forming the encoded data that is sent from the server to the client. In the trained system, the second half of transfer network 440 located at the client then populates its middle layer with these values.

Notably, on the decoder side, the decoder networks 450, 460, and 470 successively produce higher spatial resolution representations of the encoded image as a reversal of the encoding process in networks 430, 420, and 410, each using additional computational resource to do so.

Hence by stopping the decoding process at different stages, resulting in different spatial resolution data and different computational overheads, the general approach described with respect to FIG. 3 can be implemented using a neural network scheme, as explained further below.

For scenario 1 as described previously, the full decoder can be run (i.e. up to and including final decoder stage 470) to produce high quality frames corresponding to those of the original input.

For scenario 2, optionally the final decoder stage 470 is only run every other frame. Earlier stages may be run to the extent that any output data from a frame is used as input to the next frame (as may be the case in some varieties of network). In this case for example decoder stage 450 and optionally 460 may run on every frame, but decoder stage 460 only passes data up to decoder stage 470 every other frame, or every third frame, or the like.

For scenario 3, the output of the penultimate decoder stage 460 is used, and decoder stage 470 is effectively turned off, saving computational resource.

Meanwhile for scenario 4, the output of initial decoder stage 450 is used, and decoder stages 460 and 470 are effectively turned off. Alternatively, the penultimate decoder stage 460 may be used at a slower frame rate using a similar approach to that described in scenario 2 above for the final decoder stage.

Again it will be appreciated that the above scenarios and the notional levels of quality chosen in response are exemplary only. Hence it will also be appreciated that the attention criteria for a given stage of the NN decoder and the desired quality in response can be chosen by the skilled person based on the principles disclosed herein.

Hence more generally, for a multi-stage decoder (whether NN based or not), where two or more respective decoder stages generate decoder data at different respective spatial resolutions ('decoder data' here representing either image data or data that can be post-processed to produce image data), then the output of different respective stages can be used according to an attention estimate for the user viewing the decoded content, with a lower estimated attention correspondingly resulting in the use of earlier stages in the decoder, and/or less frequent use of higher stages where the decoder architecture permits.

It will be appreciated that for variants such as gaze-based decoding, because the image frame will typically be broken into tiles to be processed by the encoder/decoder, then tiles near the fovea region can be decoded to a higher quality (e.g. using final decoder stage 470) whilst tiles at a periphery (for example a predetermined distance from the fovea region) can be decoded at a lower quality (e.g. using middle decoder stage 460). The relative higher and lower qualities can themselves change depending on need in different scenarios; for example if the user changes from playing a game to a menu interface, the quality levels may change from high (fovea) versus medium (peripheral) quality to medium (fovea) versus low (peripheral) quality.

Similarly, a global shift in quality for the above schemes can be applied based on other factors, such as battery level and/or device processing capability. Hence for example if a battery charge of the client device drops below a predetermined level, then the output quality may shift from high quality frames output by decoder stage 470 to medium quality frames from decoder stage 460, with the other attention-based quality changes shifting down accordingly.

Similarly if a client device is reaching 100% processing capacity (or a predetermined level below this such as 90% or 95%), then the output quality may shift down in a similar manner. This helps lower capability devices, or a device that also needs to keep other software running (such as a phone).

Figure 5:
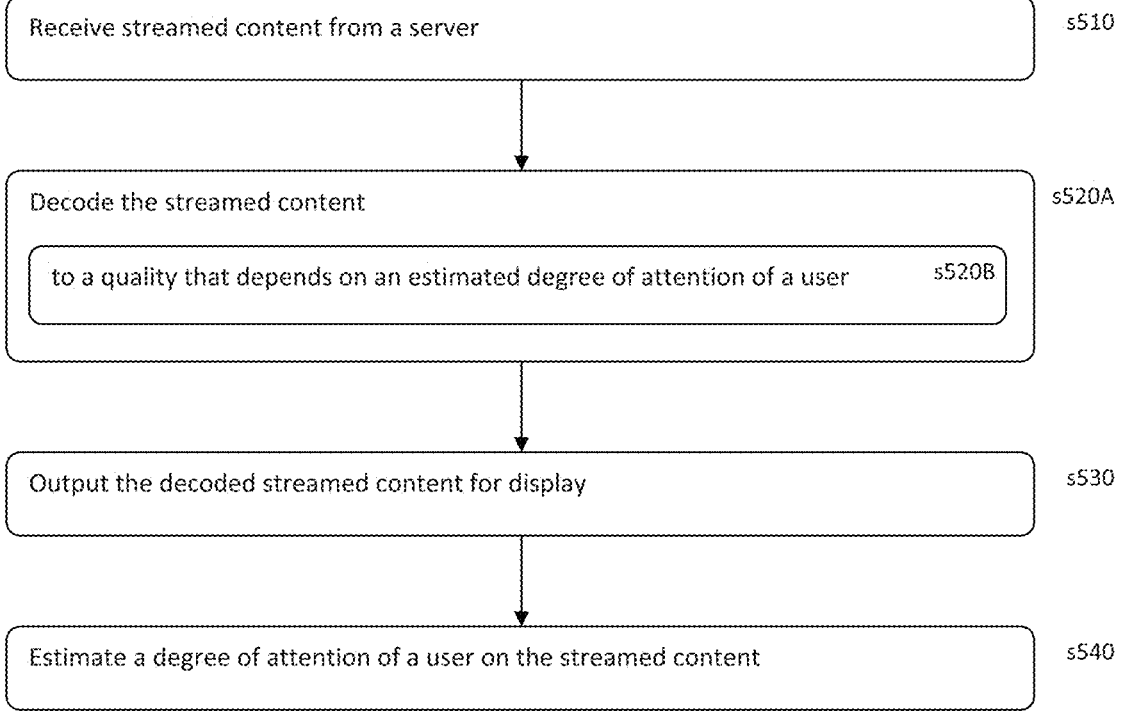
FIG. 5 is a flow diagram of method of displaying streamed content in accordance with embodiments of the present description.

Turning now to FIG. 5, in a summary embodiment of the present description, a method of displaying streamed content comprises the following steps.

In a first step s510, receiving streamed content from a server, as described elsewhere herein;

In a second step s520A, s520B, decoding the streamed content, as described elsewhere herein;

In a third step s530, outputting the decoded streamed content for display (for example in the case of a videogame console, to an output interface operable to link to a separate display such as a TV or HMD, or in the case of a phone or tablet, to a display driver of an integral display), as described elsewhere herein;

In a fourth step s540, estimating a degree of attention (engagement) of a user on the streamed content, as described elsewhere herein, and in which The decoding step comprises (s520B) decoding the content to a quality that is dependent upon the estimated degree of attention of the user, as described elsewhere herein.

It will be apparent to a person skilled in the art that variations in the above method corresponding to operation of the various embodiments of the apparatus as described and claimed herein are considered within the scope of the present invention, including but not limited to that:

In an instance of the summary embodiment, the decoding step is by a multi-stage decoder, with successive stages decoding the content to a higher quality, as described elsewhere herein;

In this case, optionally the decoding is by the decoding half of a trained multi-stage neural network autoencoder, as described elsewhere herein;

An instance of the summary embodiment comprises the step of transmitting to the server data relating to the attention of the user on the streamed content, as described elsewhere herein;

In an instance of the summary embodiment, if the user is estimated to be fully engaged with the content, then the decoder decodes the content to a highest quality (for example the high quality frames 352 of FIG. 3), as described elsewhere herein;

In an instance of the summary embodiment, if the user is estimated to be temporarily disengaged from the content, then the decoder decodes the content to a quality lower than a highest quality and higher than a low quality (for example the lower frame rate high quality frames 354 of FIG. 3, or the medium quality frames 356 of FIG. 3), as described elsewhere herein;

In an instance of the summary embodiment, if the user is estimated to be absent or likely to be disengaged from the content for a threshold period, then the decoder decodes the content to a low quality (for example the medium quality frames 356 or low quality frames 358 of FIG. 3), as described elsewhere herein;

An instance of the summary embodiment comprises the step of tracking the gaze of the user on the content, and in this case optionally the decoder decodes a region of the content being gazed at by the user to a quality higher than a region of the content not being gazed at by the user, as described elsewhere herein;

In an instance of the summary embodiment, a highest decoder quality is set responsive to one or more selected from the list consisting of the battery level and the processor load, as described elsewhere herein; and In an instance of the summary embodiment, the output of the decoding step is post-processed to generate an output image for viewing by the user, as described elsewhere herein.

Turning now to FIG. 6, in a summary embodiment of the present description, a method of streaming content to a client comprises the following steps.

In a first step s610, obtaining content for streaming, for example from storage or by generating the content (e.g. using a videogame console or equivalent), either at a streaming server or at a content server that supplies image frames for streaming to a streaming server, as described elsewhere herein;

In a second step s620A, s620B, encoding the content for streaming, as described elsewhere herein;

In a third step s630, streaming the encoded content to at least a first client device, as described elsewhere herein; and In a fourth step s640, receiving from the at least first client device user state information comprising information relating to the current engagement of the user with the streamed content, as described elsewhere herein, and in which The encoding step comprises (s620B) encoding the content for streaming at a quality responsive to the information relating to the current engagement of the user with the streamed content, as described elsewhere herein.

It will be apparent to a person skilled in the art that variations in the above method corresponding to operation of the various embodiments of the apparatus as described and claimed herein are considered within the scope of the present invention, including but not limited to that:

In an instance of the summary embodiment, the encoding is by a multi stage encoder, as described elsewhere herein;

In this case, optionally the encoder is the encoding half of a trained multi-stage neural network autoencoder, as described elsewhere herein;

In an instance of the summary embodiment, the user state information comprises an estimate of user attention/engagement generated by the client device, as described elsewhere herein;

In an instance of the summary embodiment, the user state information comprises input information for an estimate of user attention/engagement to be generated by the server, as described elsewhere herein; and In an instance of the summary embodiment, the server comprises a high quality encoder and a lower quality encoder, as described elsewhere herein.

It will be appreciated that the above methods may be carried out on conventional hardware suitably adapted as applicable by software instruction or by the inclusion or substitution of dedicated hardware, as described elsewhere herein with reference to the non-limiting example of the Sony PlayStation 5®.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A client device for displaying streamed content, comprising:

a receiver to receive streamed content from a server;

a variable decoder configured to decode the streamed content in a decoding process, with successive stages of the decoding process decoding the streamed content to a higher quality from decoded outputs of prior stages;

an output for displaying the decoded streamed content; and an attention estimation processor configured to estimate a degree of attention of a user on the streamed content; wherein the streamed content has been encoded using an encoding process with a trained multi-stage neural network autoencoder configured for preserving size and spatial resolution of the streamed content in a plurality of convolution layers, the variable decoder is further configured to decode the streamed content by performing at least one stage of the decoding process in a reversal of the encoding process with the trained multi-stage neural network autoencoder based only on the streamed content, and the variable decoder is configured to selectively decode the streamed content in accordance with the estimated degree of attention of the user.

2. The client device of claim 1, wherein the variable decoder is further configured to decode the streamed content to a higher quality including a higher spatial resolution representation of the streamed content, in accordance with detection of a high estimated degree of attention of the user.

3. The client device of claim 1, further comprising: a transmitter configured to transmit to the server data relating to the degree of attention of the user on the streamed content.

4. The client device of claim 3, wherein if the user is estimated to be fully engaged with the streamed content, then the variable decoder performs all stages of the decoding process.

5. The client device of claim 1, wherein if the user is estimated to be temporarily disengaged from the streamed content, then the variable decoder performs fewer than all of the stages of the decoding process.

6. The client device of claim 1, wherein if the user is estimated to be one of absent and disengaged from the streamed content for a threshold period, then the variable decoder selectively decodes the streamed content to a low quality.

7. The client device of claim 1, further comprising:

a gaze tracker configured to identify a region of the streamed content corresponding to a gaze of the user, wherein the variable decoder is further configured to decode the region of the streamed content corresponding to the gaze of the user to a quality higher than a portion of the streamed content outside of the region.

8. The client device of claim 1, in which a highest decoder quality is set responsive to one or more of:

i. battery level; and ii. processor load.

9. The client device of claim 1, in which: the output of the variable decoder is post-processed to generate an output image for viewing by the user.

10. A method of displaying streamed content at a client device, comprising:

receiving streamed content from a server;

decoding the streamed content using a variable decoder in a decoding process, wherein successive stages of the decoding process decode the streamed content to a higher quality from decoded outputs of prior stages;

displaying the decoded streamed content; and estimating a degree of attention of a user on the streamed content;

wherein the streamed content has been encoded using an encoding process with a trained multi-stage neural network autoencoder configured for preserving size and spatial resolution of the streamed content in a plurality of convolution layers, decoding includes decoding the streamed content by performing at least one stage of the decoding process in a reversal of the encoding process with the trained multi-stage neural network autoencoder based only on the streamed content, and decoding further comprises selectively decoding the streamed content in accordance with the estimated degree of attention of the user.

11. A non-transitory, computer readable storage medium containing computer program comprising computer executable instructions adapted to cause a computer system to perform operations comprising:

receiving streamed content from a server;

decoding the streamed content using a variable decoder in a decoding process, wherein successive stages of the decoding process decode the streamed content to a higher quality from decoded outputs of prior stages;

displaying the decoded streamed content; and estimating a degree of attention of a user on the streamed content;

wherein the streamed content has been encoded using an encoding process with a trained multi-stage neural network autoencoder configured for preserving size and spatial resolution of the streamed content in a plurality of convolution layers, decoding includes decoding the streamed content by performing at least one stage of the decoding process in a reversal of the encoding process with the trained multi-stage neural network autoencoder based only on the streamed content, and decoding further comprises selectively decoding the streamed content in accordance with the estimated degree of attention of the user.

* * * * *